United States Patent
Hanselmann (10) Patent No.: US 9,182,972 B2
(45) Date of Patent: Nov. 10, 2015

(54) METHOD AND SYSTEM FOR MINIMIZING DISRUPTION DURING IN-SERVICE SOFTWARE UPGRADE

(71) Applicant: Cisco Technology, Inc., San Jose, CA (US)

(72) Inventor: Peter J. Hanselmann, Pennant Hills (AU)

(73) Assignee: Cisco Technology, Inc., San Jose, CA (US)

( * ) Notice: Subject to any disclaimer, the term of this patent is extended or adjusted under 35 U.S.C. 154(b) by 22 days.

(21) Appl. No.: 13/751,372

(22) Filed: Jan. 28, 2013

(65) Prior Publication Data

US 2013/0145359 A1 Jun. 6, 2013

Related U.S. Application Data

(63) Continuation of application No. 11/328,046, filed on Jan. 9, 2006, now Pat. No. 8,364,843.

(51) Int. Cl.

| | |
|---|---|
| H04L 12/54 | (2013.01) |
| H04L 12/771 | (2013.01) |
| G06F 9/445 | (2006.01) |
| H04L 12/707 | (2013.01) |
| H04L 12/703 | (2013.01) |
| H04L 12/773 | (2013.01) |
| H04L 29/08 | (2006.01) |
| H04L 29/14 | (2006.01) |

(52) U.S. Cl.
CPC .. *G06F 8/65* (2013.01); *G06F 8/67* (2013.01); *H04L 45/22* (2013.01); *H04L 45/28* (2013.01); *H04L 45/60* (2013.01); *H04L 67/34* (2013.01); *H04L 69/40* (2013.01)

(58) Field of Classification Search
CPC .... G06F 11/1433; H04L 45/563; H04L 45/60
See application file for complete search history.

(56) References Cited

U.S. PATENT DOCUMENTS

| | | |
|---|---|---|
| 6,535,924 B1 | 3/2003 | Kwok et al. |
| 6,917,623 B1 | 7/2005 | Acharya et al. |
| 7,051,367 B1 | 5/2006 | Krishnaswamy et al. |
| 7,107,329 B1 | 9/2006 | Schroder et al. |
| 7,206,309 B2 | 4/2007 | Pegrum et al. |
| 7,352,748 B1 | 4/2008 | Rozario et al. |
| 7,583,665 B1 * | 9/2009 | Duncan et al. ............... 370/389 |
| 2002/0141429 A1 * | 10/2002 | Pegrum et al. ............... 370/422 |
| 2003/0154301 A1 * | 8/2003 | McEachern et al. .......... 709/237 |
| 2004/0109418 A1 * | 6/2004 | Fedorkow et al. ............ 370/251 |
| 2004/0156313 A1 * | 8/2004 | Hofmeister et al. .......... 370/229 |
| 2005/0213498 A1 | 9/2005 | Appanna et al. |
| 2006/0002343 A1 * | 1/2006 | Nain et al. .................... 370/331 |
| 2006/0233182 A1 * | 10/2006 | Appanna et al. .............. 370/401 |

* cited by examiner

*Primary Examiner* — Wutchung Chu
*Assistant Examiner* — Jason Harley
(74) *Attorney, Agent, or Firm* — Parker Ibrahim & Berg LLC; James M. Behmke; Stephen D. LeBarron (57) ABSTRACT

A method and a system for in-service software upgrade in a Hot Standby Redundant Distributed (HSRD) system are provided. A standby route processor in HSRD system is updated with upgraded software. The standby route processor is synchronized with an active route processor present in the HSRD system. The control of routing process is switched over to the standby route processor (with the upgraded software) from the active route processor. During the switchover, a minimal context forwarder on the line card begins execution and continues forwarding packets across a network, while a line card in the HSRD system is being reloaded and configured.

18 Claims, 7 Drawing Sheets

METHOD AND SYSTEM FOR MINIMIZING DISRUPTION DURING IN-SERVICE SOFTWARE UPGRADE

CROSS-REFERENCE TO RELATED APPLICATIONS

This application is a continuation application of and claims priority to U.S. application Ser. No. 11/328,046, filed on Jan. 9, 2006, the contents of which are hereby incorporated by reference in its entirety.

BACKGROUND OF THE INVENTION

1. Field of Invention

Embodiments of the invention relate, in general, to upgrading software in a router. More specifically, embodiments of the invention relate to a method and a system for minimizing disruption in forwarding packets during in-service software upgrade.

2. Description of the Background Art

Routers are often used for forwarding packets across a network based on the Internet Protocol (collectively referred to as IP networks) or on other telecommunication networks.

Routers forward packets by combining hardware-forwarding capabilities with software. For example, a typical router includes a Route Processor (RP) and a number of line cards. The RP performs the routing analysis and determines the next hop for the packets. Each RP controls a plurality of line cards that function as a line terminator for interfacing telecommunication lines from the source to the rest of the network. Since a single line card provides the interface from many sources, it is a general practice to have many line cards under the control of a typical router. While some line cards utilize a dedicated processor that is hard coded to control the forwarding process, it is often preferred to use line cards that may be upgraded from time to time. Therefore, the typical line card includes a processor, often referred to as a Central Processing Unit (CPU). The CPU controls the forwarding process under the control of software code stored in a local memory on the line card.

Once the router is deployed into the network, there are times when it is necessary to upgrade the software to enhance performance or to provide new capabilities. When an upgrade is required, the router must be taken off-line to transfer and install the new software. However, when the router is off-line, it is unable to forward packet traffic, if the router uses software forwarding line cards. This leads to changes in routing tables, which include information about the IP addresses of various devices in the network. This results in the requirement for updating the routing tables throughout the network. During the updating of the routing tables, the packets are still sent in the network but the process of updating the routing tables causes undesirable network congestion, delays, and packet loss.

To overcome this problem and maintain the integrity of the routing tables, a Hot Standby Redundant Distributed (HSRD) system is often implemented. In an HSRD system, multiple route processors share an identical Internet Protocol (IP) address and a Media Access Control (MAC) address, and act together to provide a single virtual route processor in a typical router. One of the route processors in the HSRD system, referred as an active route processor, is responsible for forwarding packets. The other route processor is referred as a standby route processor. The standby route processor will take over and forward packets when the active route processor is to be taken off-line and upgraded. As a result, HSRD system maintains the forwarding of packets with the standby route processor taking control of the line cards until the software upgrade is complete on the active route processor in the router.

However, during the changeover to the standby route processor, the forwarding of the packets with the HSRD system may still get disrupted while the software code that controls the CPU on the line cards is updated to maintain compatibility with the standby route processor. This delay results in some packets being delayed or lost. Therefore, it is desirable to minimize data plane outage. For example in order to support VoIP requirements it is essential that the data plane suffers an outage of no more than 2.5 seconds (as per Bellcore standard GRE-253 for TDM Voice). Further, it is also desirable to minimize control plane outage in order that neighboring routers do not notice that the router is being upgraded. Different applications and protocols have varying timeout values, before a neighbouring router notices a peer outage.

DETAILED DESCRIPTION OF EMBODIMENTS OF THE INVENTION

Embodiments of the invention provide methods, systems, and computer-readable media for minimizing disruption in forwarding packets, during in-service software upgrade of a software forwarding device. In the description herein for embodiments of the present invention, numerous specific details are provided, such as examples of components and/or methods, to provide an understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

In a network, a Hot Standby Redundant Distributed (HSRD) system is often implemented. The HSRD includes routers that include two route processors, one of which is active and other one is standby, collectively referred as the route processors. The route processors share an IP address and a MAC address. The route processors require software for forwarding the packets, which may be modified or upgraded from time to time. During the software modification of the router, the standby route processor is upgraded first and is designated the active route processor while the formerly active route processor is designated the standby route processor. Thereafter, a line card associated with the route processors is upgraded to maintain compatibility with the upgraded software on the active route processor. In one embodiment, during the upgrading of the line card, the line card continues operating under the control of a Minimal Context Forwarder (MCF), which, more specifically, continues forwarding the packets to prevent disruption in the network due to software upgradation. After the reloading of the line card is over, the line card and the upgraded active route processor are both operating with upgraded software and the standby route processor can be upgraded in the background. In this manner, the upgrade process minimized the time during which the forwarding of packets may be interrupted.

Figure 1:
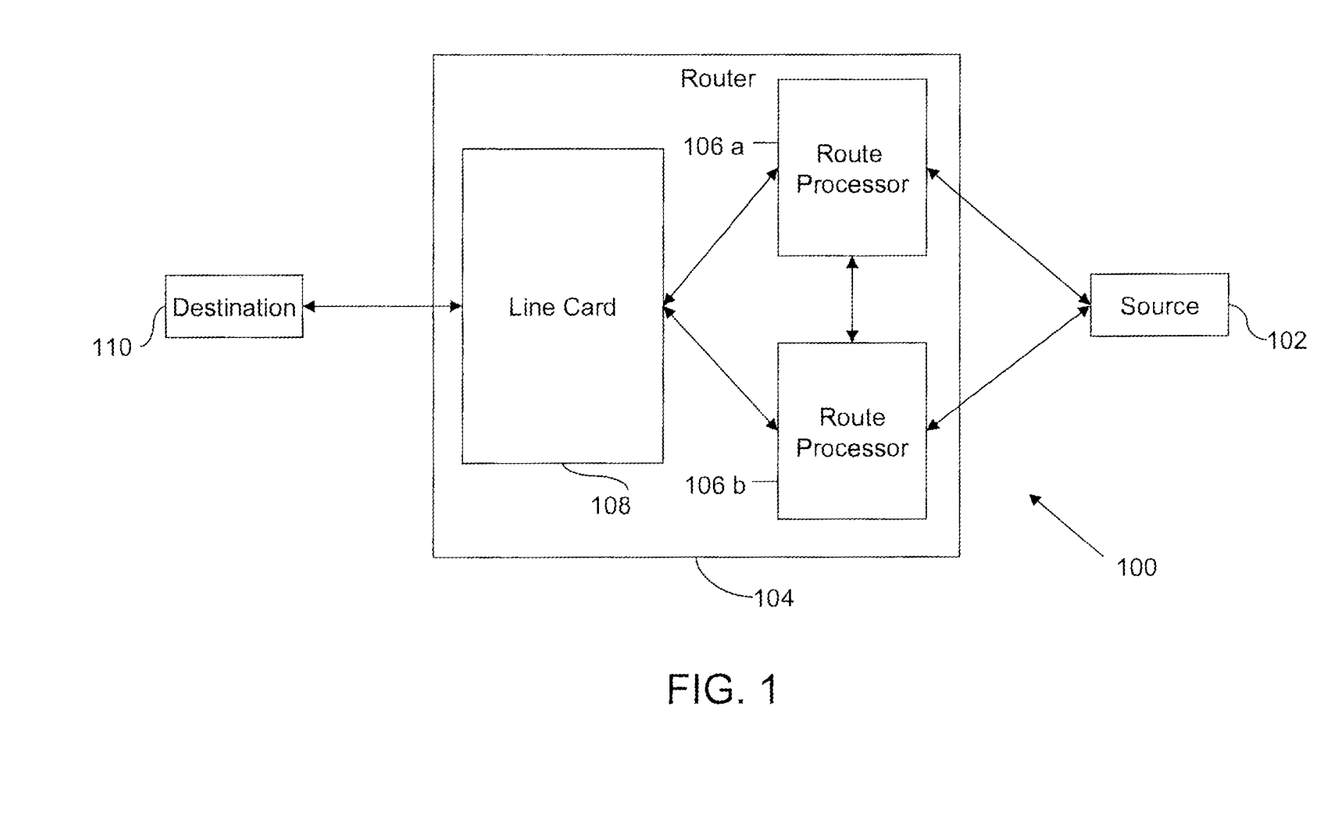
FIG. 1 illustrates a Hot Standby Redundant Distributed (HSRD) system, wherein an embodiment of the invention can be practiced.

Referring to the drawings, particularly by their reference numbers, FIG. 1 illustrates a Hot Standby Redundant Distributed (HSRD) system 100, wherein embodiments of the invention can be practiced. System 100 includes a source 102, a hot standby redundant system that includes a router 104. Further, router 104 includes a route processor 106a and another route processor 106b collectively referred as route processors 106. Route processors 106a and 106b interface with multiple line cards; however, for purpose of illustration, only a single line card, line card 108 is illustrated although one skilled in the art will recognize that a number of line cards, such as 8, 16, 32 or some other number, are typically present in an infrastructure router. Route processors 106a and 106b, collectively referred herein as route processors 106 provide the routing information so that line card 108 can direct packets to a destination 110

Source 102 can be a device present in a network. Source 102 sends packets to be forwarded to destination 108, which is another device present in another network. Such devices are well known and will not be further described herein. Router 104 allows various devices in a network to communicate with each other and with devices across the networks by forwarding packets. The network is preferably based on the Internet Protocol (collectively referred as IP networks) or other type of telecommunication network where data is transmitted over at least a portion of the network in a packet or frame format. Route processors 106a and 106b in router 104 calculate routing and forwarding tables in the network. The routing and forwarding tables include addresses of various devices in the network, which are required for deciding a path for forwarding the packets. Router 104 can be, for example, hubs, switches, brouters, and so forth.

In router 104, route processors 106a and 106b share an identical Internet Protocol (IP) address and an identical Media Access Control (MAC) address, thereby acting as a single 'virtual' route processor and continually exchanging information. The exchanged information includes a message regarding the status of route processors 106a and 106b. In router 104, one of route processors 106 is designated as active and other one is designated as standby. Therefore, for the purpose of illustration, route processor 106a is hereinafter referred as an active route processor 106a and route processor 106b is hereinafter referred as a standby route processors 106b. In another embodiment of the invention, route processor 106a can be referred as standby route processor 106a and route processor 106b can be referred as active route processor 106b.

Active route processor 106a controls the packet forwarding in and across the network while standby route processor 106b may forward the packets when active route processor 106a is unable to do. For example, during software modifications on router 104, active route processor 106a and standby route processor 106b exchange their status. Software modifications include 'software upgrading' and 'software downgrading'. During software modification, active route processor 106a continues to forward the packets to destination 110 till the software on standby route processor 106b gets modified. After the software modification on standby route processor 106b, line card 108 is reloaded according to the modified software to maintain compatibility with standby route processor 106b. During software reloading on line card 108, a minimal context forwarder (MCF) on line card 108 is initialized, which continues forwarding the packets in the network. After software modification on standby route processor 106b and software reloading on line card 108, standby route processor 106b takes over the functionalities of active route processor 106a and active route processor 106a is upgraded with the modified software.

Figure 2:
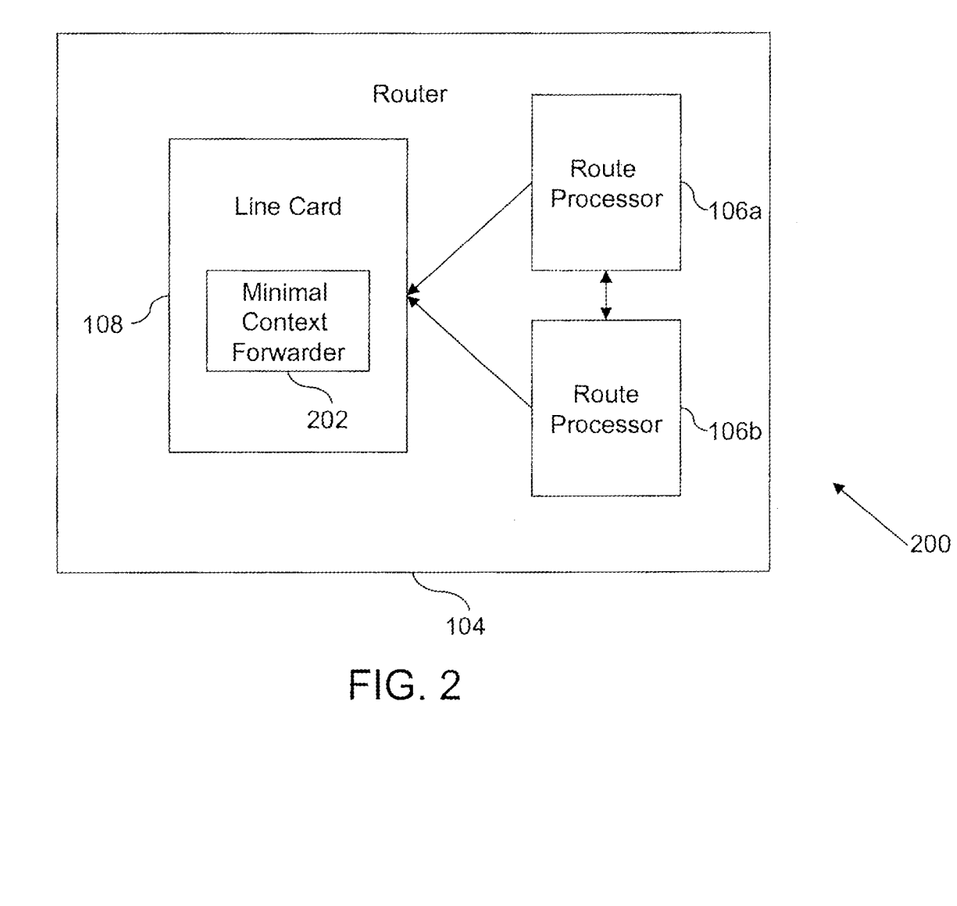
FIG. 2 illustrates a system for in-service software upgrade in an HSRD system, in accordance with an exemplary embodiment of the invention.

FIG. 2 illustrates a system for in-service software upgrade in an HSRD system, in accordance with an exemplary embodiment of the invention. System 200 includes router 104 that includes active route processor 106a and standby route processor 106b. Further, router 104 includes line card 108 that is connected to active route processors 106a and standby route processor 106b. Furthermore, line card 108 includes a minimal context forwarder 202, which controls the forwarding of the packets while line card 108 is being reloaded with modified software to match the upgraded standby route processor 106b. Line card 108 can be an SIP-1 or Flexwan software forwarding line card. For minimal context forwarder 202 to forward the packets in the network, line card 108 hardware must be previously initialized.

Minimal context forwarder 202 is a software code, downloaded from the upgraded standby route processor 106b into a permanently reserved high memory area associated with line card 108. Minimal context forwarder 202 executes from the high memory area and controls the forwarding of the packets. Minimal context forwarder 202 code is different from the modified software. However, minimal context forwarder is derived from the modified software to ensure compatibility and to minimize delay upon switchover. In an embodiment of the present invention, the modified software is a modified Internet Operating System (IOS) code. Minimal context forwarder 202 includes a subset of functionality that is provided by the modified IOS code. Minimal context forwarder 202 is built at the same time and from the same codebase as the modified IOS code on upgraded standby route processor 106b. Therefore, there are no versioning issues between minimal context forwarder 202 running on line card 108 and the modified IOS code on standby route processor 106b.

After the initialization of minimal context forwarder 202, it initially installs network-interrupt handlers. An interrupt refers to a hardware signal. A network interrupt is a hardware signal that is raised when the packet is received from or transmitted to the network. The device sends to or receives the network interrupt from minimal context forwarder 202 after installation of network interrupt handlers. Thereafter, the devices in the network initiate servicing actions for forwarding the packets by minimal context forwarder 202 through the network interrupt. Minimal context forwarder 202 deals with the device that requests the service. Minimal context forwarder 202 handles these network interrupts in the network on a high-priority basis. When line card 108 is getting reloaded with the modified IOS software, minimal context forwarder 202 handles network interrupts and also forwards the packets. However, when the modified IOS code becomes executable on line card 108, minimal context forwarder 202 handles only network interrupts till minimal context forwarder 202 stops executing.

Minimal context forwarder 202 has loader functionality. Whilst continuing to forward the packets, minimal context forwarder 202, according to loader functionality, copies a pre-downloaded modified IOS code in a low memory associated with line card 108. The modified IOS code on line card 108 is pre-downloaded from upgraded standby route processor 106b.

Figure 3:
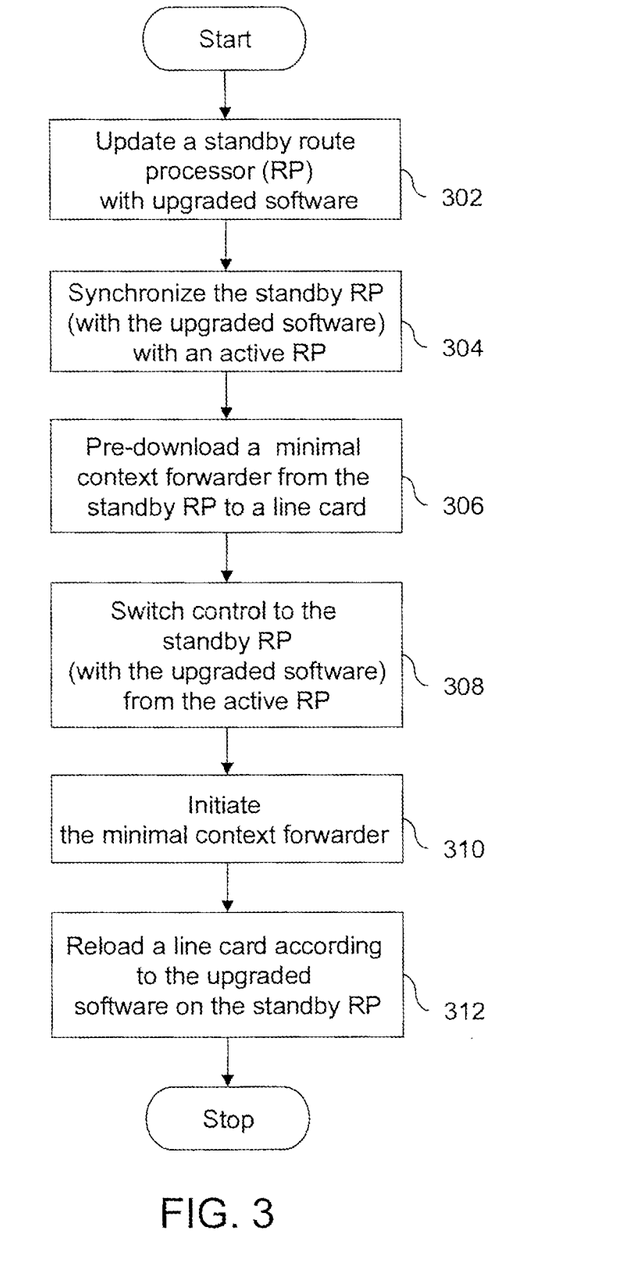
FIG. 3 is a flowchart illustrating a method for in-service software upgrade in an HSRD system, in accordance with an exemplary embodiment of the invention.

FIG. 3 is a flowchart of a method for in-service software upgrade in a hot standby redundant distributed (HSRD) system, in accordance with an exemplary embodiment of the invention. At step 302, the software of standby route processor 106b is upgraded. At step 304, upgraded standby route processor 106b is synchronized with active route processor 106a. The synchronization includes exchange of messages between active route processor 106a and upgraded standby route processor 106b. The message includes information about the status of forwarding packets in the network. At step 306, minimal context forwarder 202 is predownloaded from upgraded standby route processor 106b to line card 108. Thereafter, at step 308, the control of routing process from active route processor 106a is switched to upgraded standby route processor 106b. Subsequently, at step 310, minimal context forwarder 202 is initiated, which continues forwarding packets during the reloading of line card 108. At step 312, line card 108 is reloaded according to the upgraded software on upgraded standby route processor 106b.

Minimal context forwarder 202 supports data-plane functionality. Data-plane functions are defined as functions that are critical to forwarding the packets. Additionally, there are control-plane functions, which include maintenance functions that are not directly required to forward the packets across networks. These functions are not necessarily critical to minimal context forwarder 202 for forwarding the packets. Therefore, the control-plane functions can be performed at a lower priority than the data-plane functions. The modified IOS handles the control-plane functions, such as configuration when the modified IOS becomes fully functional. Further, the modified IOS cannot change any hardware settings of router 104, until after minimal context forwarder 202 terminates, which occurs when the modified IOS code becomes fully functional.

For forwarding the packets in the network, minimal context forwarder 202 refers to a critical context, which is maintained by line card 108. Line card 108 stores the critical context in a local persistent storage. After the switchover, in order to perform the forwarding, minimal context forwarder 202 starts executing and reading the critical context present in the persistent storage area associated with line card 108.

The critical context includes a subset of forwarding table, also known as Forwarding Information Base (FIB), which helps minimal context forwarder 202 to identify where in the network the packets should be routed to. The FIBs include Interface Descriptor Blocks (IDBs). An Interface Descriptor Block (IDB) is a special control structure included in IOS software. The IDB includes information such as the IP address, state of an interface, and data packet statistics. The critical context also includes information regarding the types of data packet encapsulation and configuration of the interface. For example, the interface can be an Asynchronous Transfer Mode Virtual Circuit (ATM VC) interface.

Figure 4A:
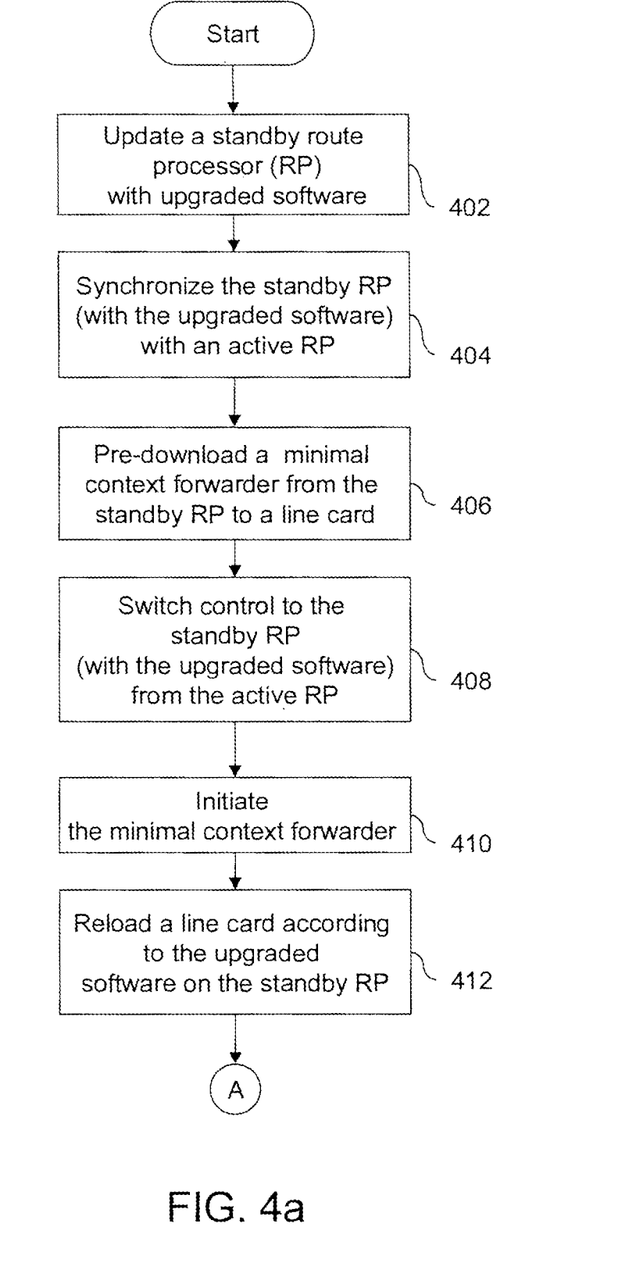
FIGS. 4A and 4B are a flowchart illustrating a method for in-service software upgrade in an HSRD system, in accordance with another exemplary embodiment of the invention.
Figure 4B:
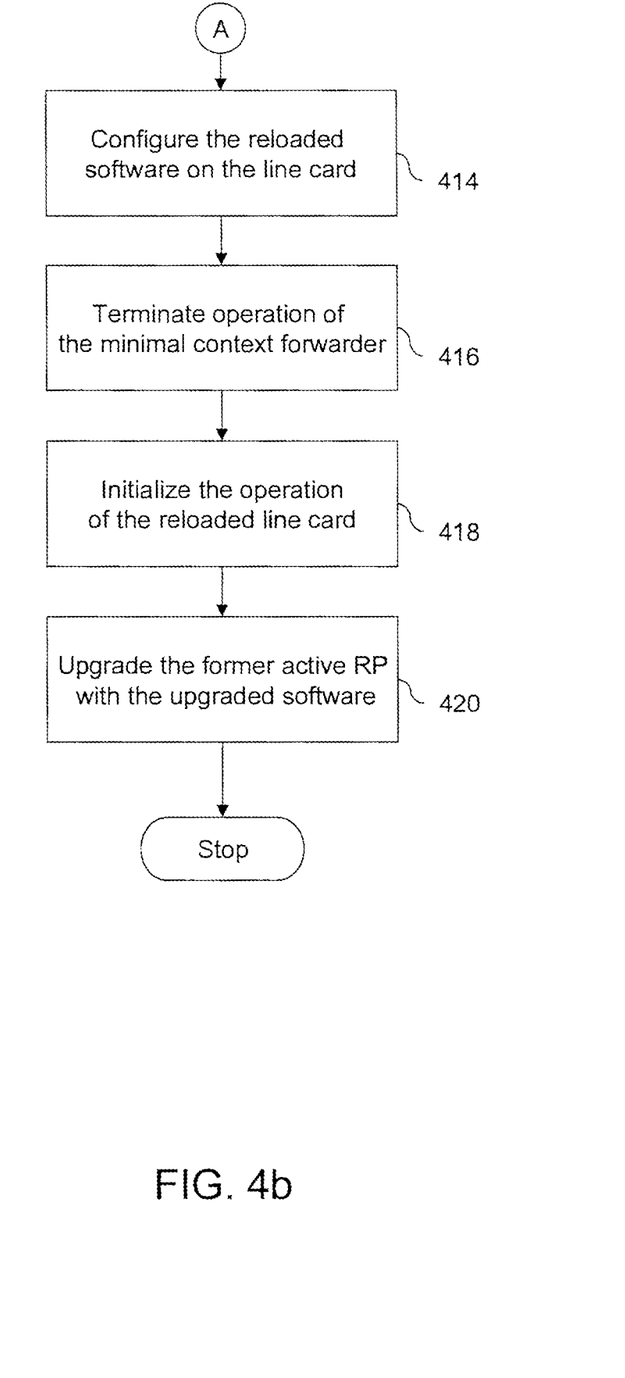

FIG. 4 is a flowchart of a method for in-service software upgrade in a hot standby redundant distributed (HSRD) system, in accordance with another exemplary embodiment of the invention. At step 402, standby route processor 106b is upgraded with the modified IOS software. At step 404, upgraded standby route processor 106b is synchronized with active route processor 106a. At step 406, minimal context forwarder 202 is predownloaded from upgraded standby route processor 106b to line card 108. Thereafter, at step 408, control of the routing process is switched over from active route processor 106a to upgraded standby route processor 106b. At step 410, minimal context forwarder 202 is initialized. At step 412, line card 108 is reloaded. Minimal context forwarder 202 continues forwarding packets in the network while line card 108 is reloaded. At step 414, the reloaded software on line card 108 is configured. At step 416, once the upgrading is over on standby route processor 106b and line card 108 is reloaded according to the upgraded software, the operation of minimal context forwarder 202 is terminated. At step 418, the operation of reloaded line card 108 is initialized. At step 420, active route processor 106a is upgraded with the modified IOS software. During the upgrading of active route processor 106a and standby route processor 106b, their functionalities are switched over. As a result, standby route processor 106b becomes an active route processor and active route processor 106a becomes a standby route processor.

Additionally, minimal context forwarder 202 prevents CPU from hanging and halting its functions by supporting a watchdog timer until the modified IOS code starts executing. The watchdog timer is a hardware, which causes the CPU to reset at the time the CPU hangs, should such a condition occur.

Figure 5:
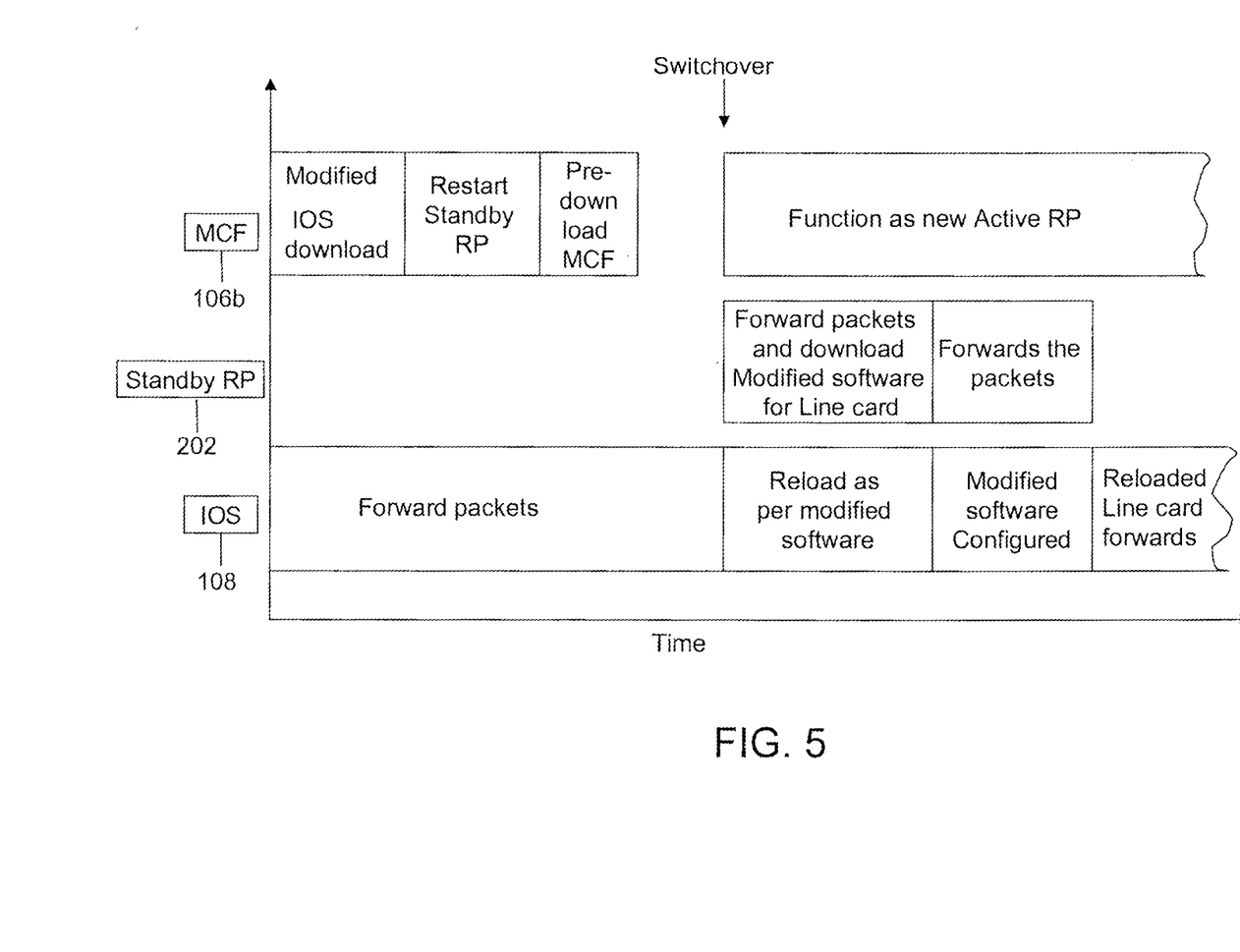
FIG. 5 is a graph illustrating timeline for in-service software upgrade in a hot standby redundant distributed (HSRD) system, in accordance with an exemplary embodiment of the invention.

FIG. 5 is a graph illustrating timeline for in-service software upgrade in a hot standby redundant distributed (HSRD) system, in accordance with an exemplary embodiment of the invention. During upgrading of standby route processor 106b and predownloading of minimal context forwarder 202, line card 108 forwards the packets. At the time of switchover of standby route processor 106b to active route processor, minimal context forwarder 202 forwards the packets and downloads the modified IOS code for line card 108 to get reloaded. Further, minimal context forwarder 202 forwards the packets during which reloaded line card 108 gets configured. Subsequently, reloaded line card 108 forwards the packets.

Minimal context forwarder 202 executes along with the modified IOS code on line card 108, when the modified IOS code becomes executable. At this stage, the modified IOS code and minimal context forwarder co-function. For minimal context forwarder 202 and the modified IOS code to co-function, the modified IOS code is required not to modify any hardware settings until after minimal context forwarder 202 terminates. The modified IOS code handles a main thread of execution, whereas minimal context forwarder 202, in addition to continuing to handle forwarding of the packets also installs a timer interrupt in order to perform periodic operations. The periodic operation includes throttling and un-throttling of the interfaces. Whilst minimal context forwarder 202 forwards the packets and handles the periodic operations, the modified IOS code receives configuration information from active route processor 106a.

After the modified IOS code becomes fully functional, the forwarding of the packets is taken over by the modified IOS code and minimal context forwarder 202 is not executed.

Figure 6:
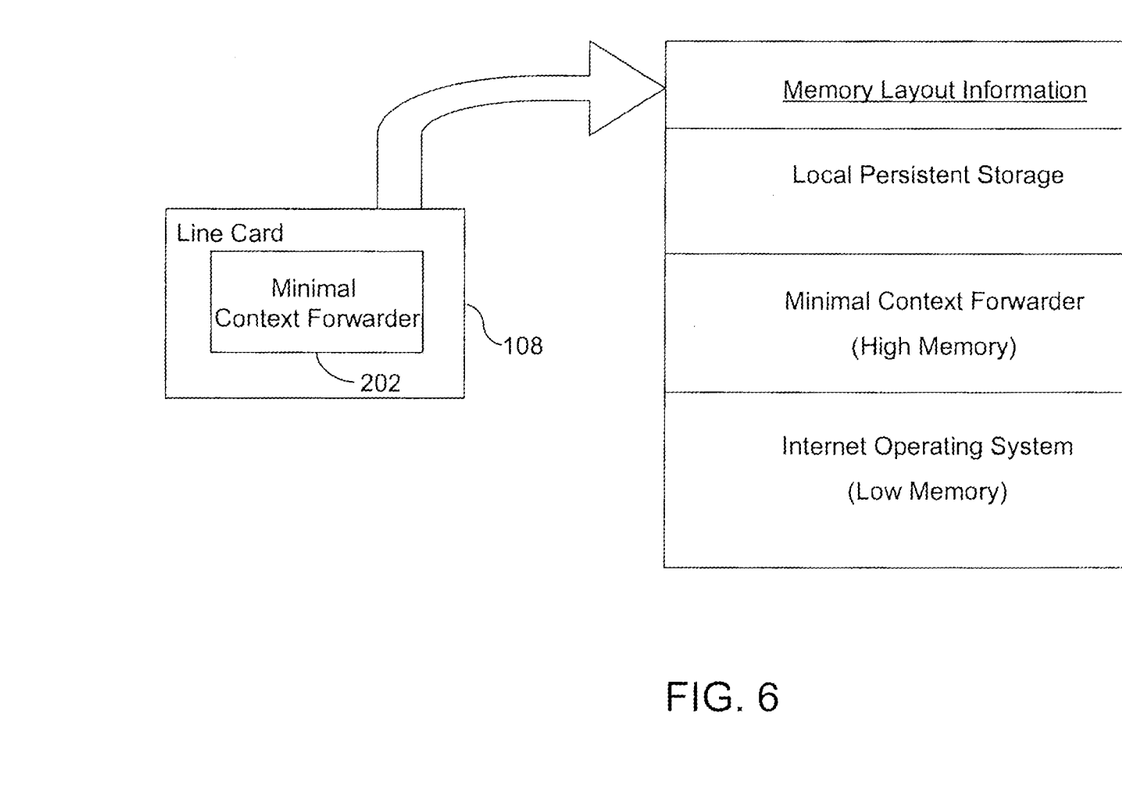
FIG. 6 illustrates a memory layout of a line card, in accordance with an exemplary embodiment of the invention.

FIG. 6 is a block diagram, illustrating a memory layout of a line card, in accordance with an exemplary embodiment of the invention. Minimal context forwarder 202 is downloaded on line card 108. Line card 108 has a permanently reserved memory space of four MB of high memory for minimal context forwarder 202. The memory space required by minimal context forwarder 202 also includes the memory space required by the critical context held in the local persistent storage. The memory space required by minimal context forwarder 202 varies with the type of line card being used. The memory space required for minimal context forwarder 202 supports the data-plane functions to be carried out. After the modified IOS code becomes fully functional, the memory space is reserved for the future functioning of minimal context forwarder 202. In an embodiment of the invention, minimal context forwarder 202 requires 1.6 MB memory space.

An embodiment of the invention provides a method for in-service software upgrade in a hot standby redundant distributed (HSRD) system. The method comprises receiving upgraded software at a standby route processor; synchronizing operation of the standby route processor with the upgraded software with an active route processor; switching control of routing process to the standby route processor with the upgraded software, wherein the standby route processor with the upgraded software becomes the active route processor and the former active router processor operates in a standby mode; initiating operation of a minimal context forwarder, wherein the minimal context forwarder forwards packets during the switching of control; and updating software code associated with a line card while packet forwarding is handled by the minimal context forwarder.

An embodiment of the invention provides a system for in-service software upgrade in a hot standby redundant distributed (HSRD) system. The system comprises two or more route processors, wherein at least one route processor is under in-service software upgrade; one or more line cards, wherein at least one line card is under software upgradation; and a minimal context forwarder, wherein the minimal context forwarder forwards the packets while a software code associated with the line card is upgraded.

An embodiment of the invention provides a system for in-service software upgrade in a hot standby redundant distributed (HSRD) system. The system comprises means for receiving upgraded software at a standby route processor; another means for synchronizing operation of the standby route processor with the upgraded software with an active route processor; still another means for switching control of routing process to the standby route processor with the upgraded software, wherein the standby route processor with the upgraded software becomes the active route processor and the former active router processor operates in a standby mode; yet another means for initiating operation of a minimal context forwarder, wherein the minimal context forwarder forwards packets during the switching of control; and yet another means for updating software code associated with a line card while packet forwarding is handled by the minimal context forwarder.

An embodiment of the invention provides a machine-readable medium including instructions executable by the processor. The machine-readable medium comprises one or more instructions for receiving upgraded software at a standby route processor; another one or more instructions for synchronizing operation of the standby route processor with the upgraded software with an active route processor; still another one or more instructions for switching control of routing process to the standby route processor with the upgraded software, wherein the standby route processor with the upgraded software becomes the active route processor and the former active router processor operates in a standby mode; yet another one or more instructions for initiating operation of a minimal context forwarder, wherein the minimal context forwarder forwards packets during the switching of control; and yet another one or more instructions for updating software code associated with a line card while packet forwarding is handled by the minimal context forwarder.

An embodiment of the invention provides an apparatus for in-service software upgrade in a hot standby redundant distributed (HSRD) system. The apparatus comprises a processor for executing instructions; and a machine-readable medium including instructions executable by the processor. The machine readable medium comprises one or more instructions for receiving upgraded software at a standby route processor; another one or more instructions for synchronizing operation of the standby route processor with the upgraded software with an active route processor; still another one or more instructions for switching control of routing process to the standby route processor with the upgraded software, wherein the standby route processor with the upgraded software becomes the active route processor and the former active router processor operates in a standby mode; yet another one or more instructions for initiating operation of a minimal context forwarder, wherein the minimal context forwarder forwards packets during the switching of control; and yet another one or more instructions for updating software code associated with a line card while packet forwarding is handled by the minimal context forwarder.

In accordance with an embodiment of the invention, the execution of the minimal context forwarder code avoids outage of data plane during reloading of the software forwarding line card. Moreover, the minimal context forwarder allows in-service software upgrading and reloading of the line card without any significant outage.

Although the invention has been discussed with respect to specific embodiments thereof, these embodiments are merely illustrative, and not restrictive, of the invention. For example, a 'method and system for minimizing disruption during in-service software (ISSU)' can include any type of analysis, manual or automatic, to anticipate the needs of communicating data.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
    enabling a first route processor to operate in an active mode and a second route processor to operate in a standby mode, wherein the first route processor operating in the active mode controls a routing process involving one or more line cards forwarding packets in a network and the second route processor operating in the standby mode does not control the routing process;
    receiving a modified system software at the second route processor operating in the standby mode, wherein the modified system software is an upgrade or downgrade of software on the second route processor;
    in response to receiving the modified system software, downloading a minimal context forwarder from the second route processor operating in the standby mode into one of the one or more line cards that is forwarding packets, the minimal context forwarder derived from the modified system software received at the second route processor and includes a subset of functionality of the modified system software;

initiating operation of the minimal context forwarder in the one or more line cards, wherein the minimal context forwarder in each of the one or more line cards controls operation of the one or more line cards respectively to continue forwarding the packets while the minimal context forwarder in each of the one or more line cards is reloading the one or more line cards with the modified system software received from the second route processor;

forwarding packets received at the one of the one or more line cards using the minimal context forwarder that is downloaded into the one of the one or more line cards;

reloading, by the minimal context forwarder that is downloaded into the one of the one or more line cards, the one of the one or more line cards with the modified system software received from the second route processor operating in the standby mode; and updating system software associated with the one of the one or more line cards with the modified system software while the minimal context forwarder that is downloaded into the one of the one or more line cards is forwarding packets.

2. The method of claim 1, comprising:

configuring the updated system software on the one of the one or more line cards; and terminating operation of the minimal context forwarder that is downloaded into the one of the one or more line cards.

3. The method of claim 2, wherein receiving the modified system software at the second route processor comprises:

updating the second route processor operating in the standby mode with the modified system software;

synchronizing operation of the updated second route processor operating in standby mode with the first route processor;

switching control of the routing process from the first route processor to the second route processor such that the second route processor operates in the active mode and the first route processor operates in the standby mode; and upgrading the first route processor with the modified system software.

4. The method of claim 3, wherein synchronizing operation of the updated second route processor with the first route processor comprises:

exchanging messages between the first route processor and the second route processor operating in standby mode, the messages including information on status of forwarding packets in the network.

5. The method of claim 1, wherein forwarding packets received at the one of the one or more line cards using the minimal context forwarder comprises:

executing, by the minimal context forwarder, a critical context that is maintained by the one of the one or more line cards in a local persistent storage associated with the one of the one or more line cards, the critical context including a subset of a forwarding table known as the Forwarding Information Base (FIB) that provides information identifying network locations for forwarding packets.

6. The method of claim 5, wherein executing the critical context comprises:

reading, by the minimal context forwarder, the critical context, and wherein the critical context includes information regarding types of data packet encapsulation and configuration of network interfaces.

7. A system comprising:

a processor; and instructions encoded in a non-transitory machine-readable medium for execution by the processor and, when executed, configured to cause the processor to perform operations comprising:

enabling a first route processor to operate in an active mode and a second route processor to operate in a standby mode, wherein the first route processor operating in the active mode controls a routing process involving one or more line cards forwarding packets in a network and the second route processor operating in the standby mode does not control the routing process;

receiving a modified system software at the second route processor operating in the standby mode;

downloading a minimal context forwarder from the second route processor operating in the standby mode into one of the one or more line cards that is forwarding packets, the minimal context forwarder derived from the modified system software received at the second route processor and includes a subset of functionality of the modified system software;

initiate operation of the minimal context forwarder in the one or more line cards, wherein the minimal context forwarder in each of the one or more line cards controls operation of the one or more line cards respectively to continue forwarding the packets while the minimal context forwarder in each of the one or more line cards is reloading the one or more line cards with the modified system software received from the second route processor;

forwarding packets received at the one of the one or more line cards using the minimal context forwarder that is downloaded into the one of the one or more line cards;

reloading, by the minimal context forwarder that is downloaded into the one of the one or more line cards, one of the one or more line cards with the modified system software received from the second route processor operating in the standby mode; and updating system software associated with the one of the one or more line cards with the modified system software while the minimal context forwarder that is downloaded into the one of the one or more line cards is forwarding packets.

8. The system of claim 7, wherein the instructions are configured to cause the processor to perform operations comprising:

configuring the updated system software on the one of the one or more line cards; and terminating operation of the minimal context forwarder that is downloaded into the one of the one or more line cards.

9. The system of claim 8, wherein the instructions that are configured to cause the processor to perform operations comprising receiving the modified system software at the second route processor include instructions are configured to cause the processor to perform operations comprising:

updating the second route processor operating in the standby mode with the modified system software;

synchronizing operation of the updated second route processor operating in standby mode with the first route processor;

switching control of the routing process from the first route processor to the second route processor such that the second route processor operates in the active mode and the first route processor operates in the standby mode; and upgrading the first route processor with the modified system software.

10. The system of claim 9, wherein the instructions are configured to cause the processor to perform operations comprising synchronizing operation of the updated second route processor with the first route processor include instructions are configured to cause the processor to perform operations comprising:

exchanging messages between the first route processor and the second route processor operating in standby mode, the messages including information on status of forwarding packets in the network.

11. The system of claim 7, wherein the instructions are configured to cause the processor to perform operations comprising forwarding packets received at the one of the one or more line cards using the minimal context forwarder include instructions are configured to cause the processor to perform operations comprising:

executing, by the minimal context forwarder, a critical context that is maintained by the one of the one or more line cards in a local persistent storage associated with the one of the one or more line cards, the critical context including a subset of a forwarding table known as the Forwarding Information Base (FIB) that provides information identifying network locations for forwarding packets.

12. The system of claim 11, wherein the instructions are configured to cause the processor to perform operations comprising executing the critical context include instructions are configured to cause the processor to perform operations comprising:

reading, by the minimal context forwarder, the critical context, wherein the critical context includes information regarding types of data packet encapsulation and configuration of network interfaces.

13. A non-transitory machine readable medium having instructions thereon, the instructions, when executed by a processor on a device in a computer network, operable to:

enable a first route processor to operate in an active mode and a second route processor to operate in a standby mode, wherein the first route processor operating in the active mode controls a routing process involving one or more line cards forwarding packets in a network and the second route processor operating in the standby mode does not control the routing process;

receive a modified system software at the second route processor operating in the standby mode, wherein the modified system software is an upgrade or a downgrade of software on the second route processor;

in response to receiving the modified system software, download a minimal context forwarder from the second route processor operating in the standby mode into one of the one or more line cards that is forwarding packets, the minimal context forwarder derived from the modified system software received at the second route processor and includes a subset of functionality of the modified system software;

initiate operation of the minimal context forwarder in the one or more line cards, wherein the minimal context forwarder in each of the one or more line cards controls operation of the one or more line cards respectively to continue forwarding the packets while the minimal context forwarder in each of the one or more line cards is reloading the one or more line cards with the modified system software received from the second route processor;

forward packets received at the one of the one or more line cards using the minimal context forwarder that is downloaded into the one of the one or more line cards, the one of the one or more line cards with the modified system software received from the second route processor operating in a standby mode; and update system software associated with the one of the one or more line cards with the modified system software while the minimal context forwarder that is downloaded into the one of the one or more line cards is forwarding packets.

14. The non-transitory machine readable medium of claim 13, wherein the instructions are configured to cause the processor to perform operations comprising:

configuring the updated system software on the one of the one or more line cards; and terminating operation of the minimal context forwarder that is downloaded into the one of the one or more line cards.

15. The non-transitory machine readable medium of claim 14, wherein the instructions that are configured to cause the processor to perform operations comprising receiving the modified system software at the second route processor include instructions are configured to cause the processor to perform operations comprising:

updating the second route processor operating in the standby mode with the modified system software;

synchronizing operation of the updated second route processor operating in standby mode with the first route processor;

switching control of the routing process from the first route processor to the second route processor such that the second route processor operates in the active mode and the first route processor operates in the standby mode; and upgrading the first route processor with the modified system software.

16. The non-transitory machine readable medium of claim 15, wherein the instructions are configured to cause the processor to perform operations comprising synchronizing operation of the updated second route processor with the first route processor include instructions are configured to cause the processor to perform operations comprising:

exchanging messages between the first route processor and the second route processor operating in standby mode, the messages including information on status of forwarding packets in the network.

17. The non-transitory machine readable medium of claim 13, wherein the instructions are configured to cause the processors to perform operations comprising forwarding packets received at the one of the one or more line cards using the minimal context forwarder include instructions are configured to cause the processor to perform operations comprising:

executing, by the minimal context forwarder, a critical context that is maintained by the one of the one or more line cards in a local persistent storage associated with the one of the one or more line cards, the critical context including a subset of a forwarding table known as the Forwarding Information Base (FIB) that provides information identifying network locations for forwarding packets.

18. The non-transitory machine readable medium of claim 17, wherein the instructions are configured to cause the processor to perform operations comprising executing the critical context include instructions are configured to cause the processor to perform operations comprising:
    reading, by the minimal context forwarder, the critical context, wherein the critical context includes information regarding types of data packet encapsulation and configuration of network interfaces.

* * * * *